(12) United States Patent
Kawamoto et al.

(10) Patent No.: US 7,798,738 B2
(45) Date of Patent: Sep. 21, 2010

(54) SWIVEL JOINT FOR CONSTRUCTION MACHINE

(75) Inventors: Junya Kawamoto, Moriyama (JP); Kazuyoshi Yamada, Kouka (JP); Yasutaka Tsuruga, Moriyama (JP); Kenji Itou, Higashioumi (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 965 days.

(21) Appl. No.: 10/567,908

(22) PCT Filed: Dec. 6, 2004

(86) PCT No.: PCT/JP2004/018156

§ 371 (c)(1),
(2), (4) Date: Feb. 10, 2006

(87) PCT Pub. No.: WO2005/061805

PCT Pub. Date: Jul. 7, 2005

(65) Prior Publication Data

US 2007/0024052 A1 Feb. 1, 2007

(30) Foreign Application Priority Data

Dec. 18, 2003 (JP) .............................. 2003-421519

(51) Int. Cl.
*F16K 99/00* (2006.01)
(52) U.S. Cl. .......................... 403/38; 180/305; 180/306
(58) Field of Classification Search ......... 180/305–308; 403/38, 39, 164; 285/272
See application file for complete search history.

(56) References Cited

U.S. PATENT DOCUMENTS

| | | | | | |
|---|---|---|---|---|---|
| 2,404,494 | A | * | 7/1946 | Halby et al. ................... | 285/94 |
| 2,873,810 | A | * | 2/1959 | Orton .......................... | 180/305 |
| 3,477,746 | A | * | 11/1969 | Watson ........................ | 285/119 |
| 3,776,270 | A | * | 12/1973 | Wanger ....................... | 137/580 |
| 3,910,309 | A | * | 10/1975 | Kaiser ......................... | 137/580 |
| 4,186,763 | A | * | 2/1980 | Ferguson et al. ............ | 239/728 |
| 4,250,918 | A | * | 2/1981 | Tuson et al. ................. | 137/580 |
| 4,558,890 | A | * | 12/1985 | Schartz ........................ | 285/13 |
| 4,605,096 | A | * | 8/1986 | Bishop ........................ | 182/51 |

(Continued)

FOREIGN PATENT DOCUMENTS

DE 197 32 868 A1 2/1999

(Continued)

*Primary Examiner*—Lesley D Morris
*Assistant Examiner*—Vaughn T Coolman
(74) *Attorney, Agent, or Firm*—Mattingly & Malur, P.C.

(57) ABSTRACT

A swivel joint for a construction machine is mounted to an upper track frame, and a body is rotatable together with a swing structure main frame in an opening through engagement between a stopper projection and a stopper plate. Tubes on the swing structure side are connected to an upper end surface of the body by using fittings in concentrated layout, and tubes on the travel structure side are connected to a lower portion of the spindle by using fittings. The body has thicker wall portions in sidewalls thereof, and a plurality of axial passages communicating with a plurality of circumferential grooves are formed inside the thicker wall portions. The plurality of axial passages are opened at the upper end surface of the body, and the tubes on the swing structure side are connected to the upper end surface of the body in concentrated layout.

4 Claims, 7 Drawing Sheets

U.S. PATENT DOCUMENTS

| | | | | |
|---|---|---|---|---|
| 5,156,422 | A * | 10/1992 | Shibano | 285/123.1 |
| 5,188,146 | A * | 2/1993 | Cook et al. | 137/580 |
| 5,282,363 | A * | 2/1994 | Ogawa et al. | 60/420 |
| 5,553,405 | A * | 9/1996 | Hayashi et al. | 37/189 |
| 6,266,901 | B1 * | 7/2001 | Kanda et al. | 37/403 |
| 6,578,296 | B2 * | 6/2003 | Kimoto et al. | 37/443 |
| 7,032,353 | B2 * | 4/2006 | Johnstone et al. | 52/65 |
| 2004/0114994 | A1 * | 6/2004 | Tsutsumi et al. | 403/164 |
| 2005/0079007 | A1 * | 4/2005 | Katsuta | 403/164 |

FOREIGN PATENT DOCUMENTS

| | | |
|---|---|---|
| EP | 0 494 070 B2 | 2/2000 |
| JP | 5-64243 | 8/1993 |
| JP | 7-26445 | 6/1995 |
| JP | 9-328778 | 12/1997 |
| JP | 11-107317 | 4/1999 |
| JP | 11-107903 | 4/1999 |
| JP | 2001-271382 | 10/2001 |

* cited by examiner

SWIVEL JOINT FOR CONSTRUCTION MACHINE

TECHNICAL FIELD

The present invention relates to a swivel joint for a construction machine, such as a hydraulic excavator or a hydraulic crane, which includes a swing structure mounted on a travel structure in a siwngable manner.

BACKGROUND ART

A swivel joint for a construction machine is used to couple tubes for communication between hydraulic equipment disposed on the swing structure, such as a valve apparatus for control of travel motors, and hydraulic equipment mounted to the travel structure, such as the travel motors, in a relatively rotatable manner. The swivel joint comprises a body and a spindle rotatably inserted in the body. A plurality of circumferential grooves are formed in each of an inner circumferential surface of the body and an outer circumferential surface of the spindle, and a plurality of axial passages are formed inside the spindle. A plurality of tubes connected to the body and a plurality of tubes connected to the spindle are held in communicated state in corresponding relation through the circumferential grooves and the axial passages.

In general, there are two types of structures for the swivel joint. One structure is the type (spindle fixed type) in which the spindle is mounted to the travel structure (travel frame) and the body is mounted to be rotatable together with the swing structure (swing structure main frame). The other is the type (body fixed type) in which the body is mounted to the travel structure (travel frame) and the spindle is mounted to be rotatable together with the swing structure (swing structure main frame). The former (spindle fixed type) is disclosed in, e.g., JP,U 5-64243, and the latter (body fixed type) is disclosed in, e.g., JP,Y 7-26445 and JP,A 9-328778.

Patent Document 1: JP,U 5-64243
Patent Document 2: JP,Y 7-26445
Patent Document 3: JP,A 9-328778

DISCLOSURE OF THE INVENTION

Problems to be Solved by the Invention

However, the above-mentioned related art has problems as follows.

In the swivel joint of the spindle fixed type, a plurality of tubes extending from the hydraulic equipment disposed on the swing structure side, such as the valve apparatus for control of the travel motors, are connected by fittings (adaptors) to a lateral surface of the body, which is rotated together with the swing structure main frame, at a position under the swing structure main frame. The tubes are routed to the interior of the swing structure main frame through a gap between an opening (opening edge) of the swing structure main frame and the body. This means the necessity of a space between the opening of the swing structure main frame and the body for allowing passage of the tubes and enabling work, such as connection and disconnection of the tubes, to be performed therein. In other words, a relatively large gap is required between the opening of the swing structure main frame and the body. As a result, dust, including earth/sand and water, is dropped and accumulated on a lower portion of the body to which the spindle is mounted. Thus, the spindle fixed type joint has a structure that dust, including earth/sand and water, is apt to enter a sliding gap between the lower end portion of the body and the spindle.

A dust seal is disposed in the sliding gap between the lower end portion of the body and the spindle to prevent intrusion of dust, including earth/sand and water. However, the dust seal is intended to primarily prevent intrusion of dust and has a difficulty in completely preventing intrusion of water. Also, muddy water or the like may intrude through the sliding gap between the lower end portion of the body and the spindle and may cause galling of the swivel joint due to rusting in some cases.

Similarly, the swivel joint of the body fixed type also has a problem in point of dust resistance because a gap between an upper end of the body and the spindle is located at such a position as allowing dust, including earth/sand and water, to easily intrude and accumulate.

Another problem of the swivel joint of the spindle fixed type is as follows. The body and the fittings are positioned under the swing structure main frame. At the time of replacing the swivel joint, therefore, a worker has to disconnect and connect the tubes on the body side by inserting the hand through the space between the opening of the swing structure main frame and the body, thus resulting in poor efficiency of the replacement work.

An object of the present invention is to provide a swivel joint for a construction machine, which has improved dust resistance and ensures higher efficiency in replacement work.

Means for Solving the Problems (1) To achieve the above object, the present invention provides a swivel joint for a construction machine, comprising a body rotating together with a swing structure, and a spindle mounted to a travel structure and rotatably inserted in the body, the swivel joint being provided with a plurality of first tubes connected to the body and a plurality of second tubes connected to the spindle, the plurality of first tubes and the plurality of second tubes being communicated with each other through a plurality of circumferential grooves formed in an inner peripheral surface of the body and an outer peripheral surface of the spindle and through a plurality of axial passages formed inside the spindle such that the plurality of first tubes and the plurality of second tubes are coupled to each other in a relatively rotatable manner, wherein the plurality of first tubes are connected to an upper end surface of the body in concentrated layout.

By thus connecting the first tubes to the upper end surface of the body in concentrated layout, there is no longer required a space between an opening of a main frame constituting a bottom portion of the swing structure and the body, which has been necessary for the purpose of allowing passage of the first tubes and enabling work, such as connection and disconnection of the tubes, to be performed therein. In other words, a gap (space) between the opening of the main frame and the body can be made much smaller. As a result, the amount of earth/sand dropping through the gap (space) onto a mount member for the swivel joint from above the main frame is greatly reduced, and the amount of earth/sand accumulated there is also reduced correspondingly. It is therefore possible to greatly reduce intrusion of dust, including water and earth/sand, to a lower-end sliding portion of the body with respect to the spindle. Thus, dust resistance of the swivel joint can be drastically increased.

Further, since the swivel joint has a structure that the first tubes are connected to the upper end surface of the body in concentrated layout and no fittings are provided on a lateral surface of the body, an effective outer diameter of the body, including the amounts by which the tube-connecting fittings are projected, is reduced in comparison with that in the known structure, and an overall size of the swivel joint structure including tube-connecting portions can be reduced. In addition, since the first tubes connected to the upper end surface of the body in concentrated layout can be positioned within an area defined by the outer diameter of the body, compact layout of the tubes is realized.

Moreover, according to the present invention, since the first tubes are connected to the upper end surface of the body in concentrated layout, the first tubes can be disconnected at a position above the upper end surface of the body at the time of, for example, replacing the swivel joint. As a result, the work of disconnecting the tubes can be facilitated, and the work of replacing the swivel joint can also be facilitated.

(2) In above (1), preferably, the body has thicker wall portions in sidewalls thereof, a plurality of axial passages communicating with the plurality of circumferential grooves are formed inside the thicker wall portions, the plurality of axial passages being opened at the upper end surface of the body to provide a plurality of ports, and the plurality of first tubes are connected to the plurality of ports.

With that feature, the first tubes can be connected to the upper end surface of the body in concentrated layout with a slight modification of the known structure.

(3) In above (1), preferably, the upper end surface of the body is positioned above a main frame constituting a bottom portion of the swing structure, and the plurality of first tubes are connected to the plurality of ports at a position higher than a bottom surface of the main frame.

With that feature, in the replacement work for the swivel joint, the first tubes can be disconnected at a position higher than not only the upper end surface of the body, but also the bottom surface of the mainframe. Therefore, the work of disconnecting the tubes and the work of replacing the swivel joint can be both further facilitated.

Advantages of the Invention

The present invention is able to improve dust resistance of a swivel joint and increase efficiency of the replacement work.

Also, the present invention is able to reduce the overall size of the swivel joint structure including the tube-connecting portions and to realize compact layout of the tubes.

REFERENCE NUMERALS

| | |
|---|---|
| 1 | swing structure main frame |
| 2 | track frame |
| 2a | upper track frame |
| 2b | lower track frame |
| 3 | swivel race |
| 3a | inner race |
| 3b | outer race |
| 4 | swivel race support |
| 5 | internal gear |
| 6 | swing motor |
| 7 | pinion |
| 8 | grease bath |
| 11 | swivel joint |
| 12 | body |
| 13 | spindle |
| 14 | mount plate |
| 15 | opening |
| 16 | stopper projection |
| 17 | stopper plate |
| 21, 23 | tube |
| 22, 24 | fitting (adaptor) |
| 26 | opening |
| 27 | cover |
| 28 | cover |
| 31, 32 | thicker wall portion |
| 33, 34 | axial passage |
| 35, 36 | port |
| 41 | circumferential groove |
| 43, 44 | radial passage |
| 45 | axial passage |
| 46 | plurality of radial passage |
| 47 | port |
| 52 | port |
| 53 | axial passage |
| 55 | dust seal |
| 56 | O-ring seal |

BEST MODE FOR CARRYING OUT THE INVENTION

An embodiment of the present invention will be described below with reference to the drawings.

Figure 1:
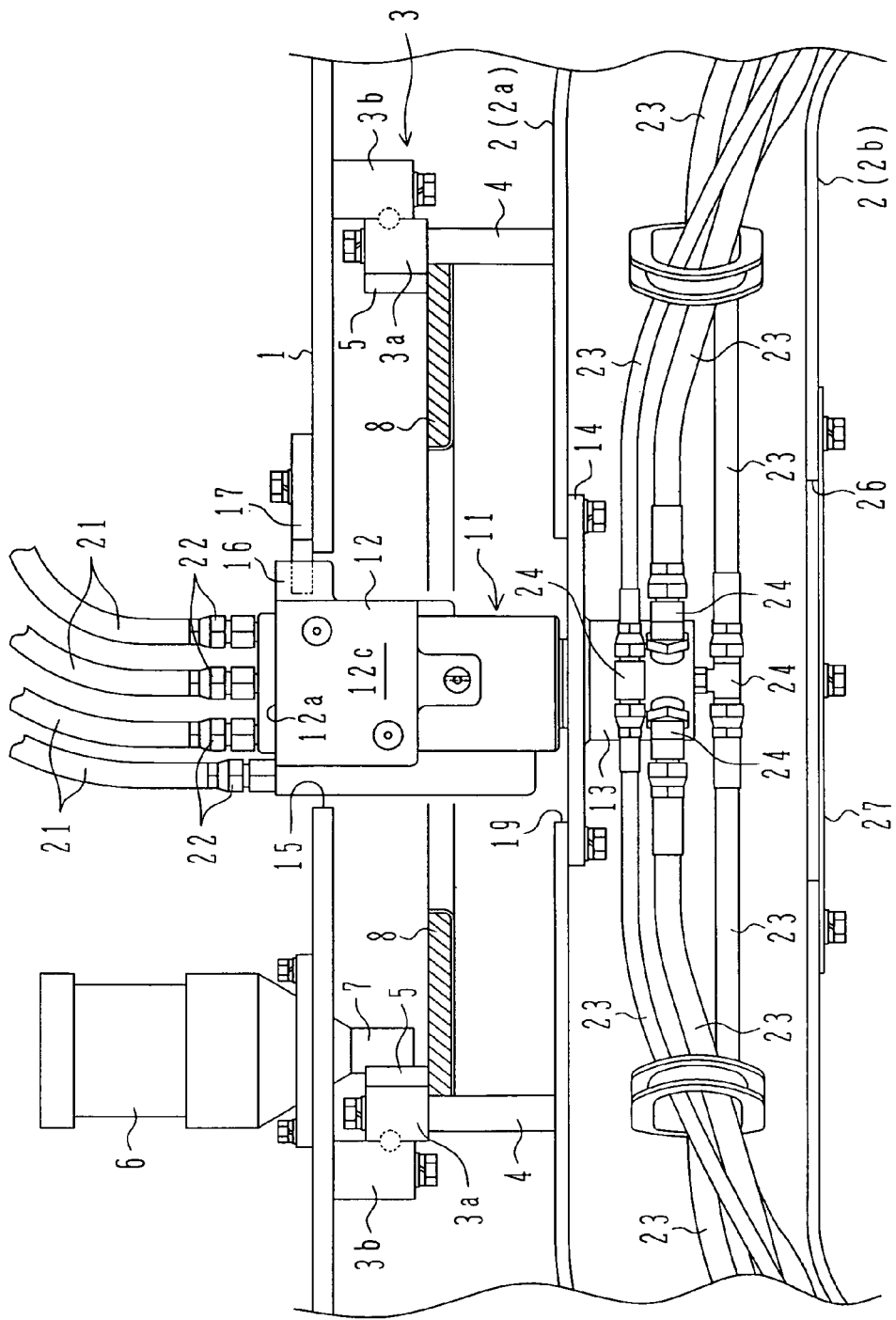
FIG. 1 is a sectional view showing a swivel joint according to one embodiment of the present invention in a mounted state.

FIG. 1, is a sectional view showing a state in which a swivel joint according to the present invention is mounted between a swing structure and a travel structure of a hydraulic excavator.

In FIG. 1, numeral 1 denotes a main frame constituting a bottom portion of the swing structure, and 2a, 2b denote an upper track frame and a lower track frame, respectively, both the frames constituting a track frame 2 of the travel structure. A swivel race 3 made up of an inner race 3a and an outer race 3b, which are rotatable relative to each other, is positioned between the main frame 1 and the upper track frame 2a. The inner race 3a is fixed by bolts to a swivel race support 4 having a ring-like shape and mounted on the upper track frame, and the outer race 3b is fixed to a lower surface of the main frame 1 by bolts. An internal gear 5 is formed at an inner periphery of the inner race 3a, and a pinion 7 fitted over an output shaft of a swing motor 6 is meshed with the internal gear 5. The swing motor 6 is fixed to the main frame 1 by bolts, and the pinion 7 and the output shaft are projected downward from the main frame 1. A grease bath 8 for lubricating meshed portions between the gear 5 of the inner race 3a and the pinion 7 of the swing motor 6 is formed as an inner space in an upper portion of the swivel race support 4.

A swivel joint 11 comprising a body 12 and a spindle 13 rotatably inserted in the body 12 is disposed at the center of the swivel race 3 in concentric relation. The spindle 13 is provided with a mount plate 14 and is mounted to the upper track frame 2a by fixing the mount plate 14 to the edge of an opening 19 formed in the upper track frame 2a from below by bolts. The body 12 is positioned in an opening 15 formed in the swing structure main frame 1 such that an upper end of the body 12 projects above the swing structure main frame 1. A stopper projection 16 provided on an upper portion of the body 12 is engaged with a stopper plate 17 fixed to the main frame 1 by bolts, whereby the body 12 is rotatable together with the swing structure main frame 1.

To an upper end surface 12a of the body 12, tubes (hoses) 21 extending to hydraulic equipment disposed on the swing structure, such as valve apparatuses (directional control valves) for control of travel motors and a blade, are connected by fittings (adaptors) 22 in concentrated layout. Also, tubes (hoses) 23 extending to hydraulic equipment disposed on the travel structure, such as the travel motors and a blade cylinder, are connected to a portion of the spindle 13 projecting below the mount plate 14 by fittings (adaptors) 24.

An opening 26 for use in working is formed in the lower track frame 2b at a position just under the swivel joint 11, and the opening 26 is closed by a cover 27 fixed to the lower track frame 2b from below by bolts. The cover 27 serves to not only prevent the spindle 13 and the tubes 23 from being damaged by stones, rocks, earth and sand coming from the exterior, but also to facilitate the work of replacing the swivel joint.

Figure 2:
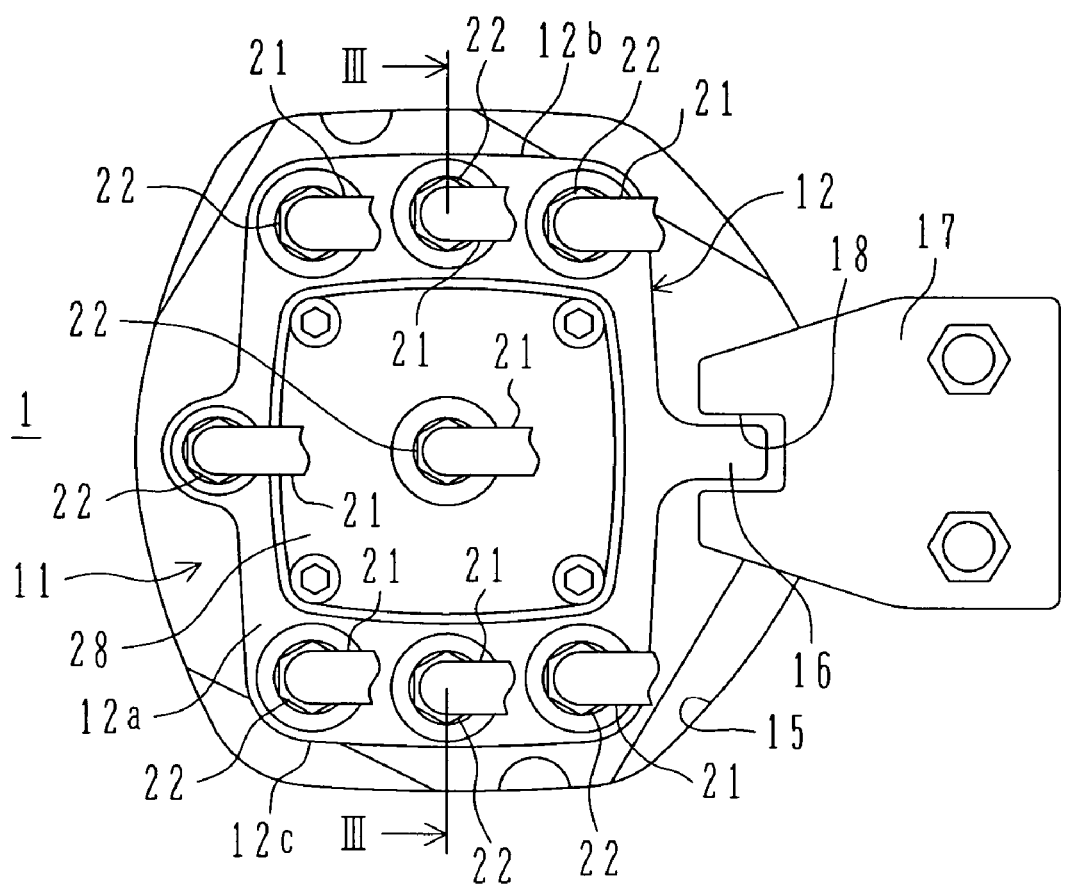
FIG. 2 shows the swivel joint and an opening of a swing structure main frame when looking from above.

FIG. 2 shows the swivel joint 11 and the opening 15 of the swing structure main frame 1 when looking from above.

The upper end surface 12a of the body 12 of the swivel joint 11 has a substantially rectangular shape. A stopper portion 16 is provided on the body 12 so as to project from a central portion of one longer side of the upper end surface 12a and come into a groove 18 formed in the stopper plate 17. The fittings 22 for connecting the tubes are provided eight in total, i.e., three on each of upper and lower sides, as viewed in the drawing, of the upper end surface 12a of the body 12, one on the side opposed to the stopper portion 16, and one on a cover 28 covering a central area of the upper end surface 12a.

Returning to FIG. 1, a space in which a mount member for the swivel joint 11 is positioned is closed at the lower side thereof by both the mount plate 14 of the spindle 13 and the upper track frame 2a and at the outer peripheral side thereof by both the swivel race support 4 and the swivel race 3. Further, the space is covered at the upper side thereof by the swing structure main frame 1 having the opening 15. With this embodiment, since the fittings 22 for connecting the tubes (hoses) 21 are disposed on the upper end surface 12a of the body 12 in concentrated layout and the tubes 21 are also connected in concentrated layout as described above, there is no longer required a space between the opening 15 of the swing structure main frame 1 and the body 12, which has been necessary for the purpose of allowing passage of the tubes 21 and enabling work, such as connection and disconnection of the tubes 21, to be performed therein. In other words, as shown in FIG. 2, a gap (space) between the opening 15 of the swing structure main frame 1 and the body 12 can be made very small (as described later). As a result, the space in which the mount member for the swivel joint 11 is positioned is provided as a closed space having a very small opening even at the upper side as well. This is effective in greatly reducing the amount of earth/sand dropping onto the mount member for the swivel joint 11, and in drastically increasing the dust resistance of the swivel joint 11 and prolonging the service life of the grease bath 8.

Figure 3:
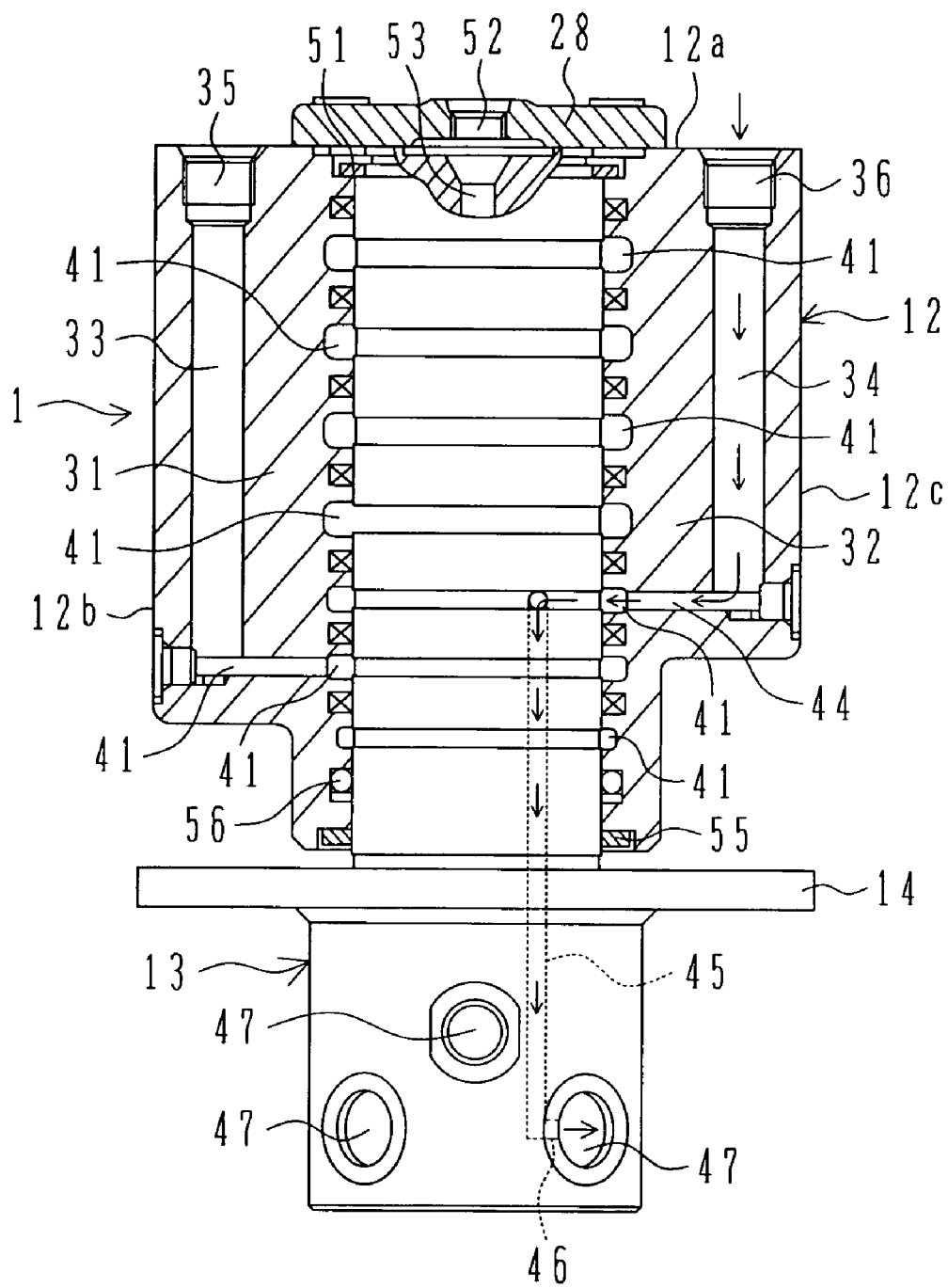
FIG. 3 shows a sectional structure of the swivel joint when a body is cut taken along the line III-III in FIG. 2.

FIG. 3 shows a sectional structure of the swivel joint 11 when the body is cut taken along the line III-III in FIG. 2. Note that the fittings are omitted from FIG. 3.

The body 12 has thicker wall portions 31, 32 in its sidewalls 12b, 12c on the left and right sides (upper and lower sides in FIG. 2), respectively. Corresponding to the tube-connecting fittings 22 disposed on the upper end surface 12a of the body 12 three on each of the upper and lower sides in FIG. 2, three axial passages 33, 34 (only one of which is shown in FIG. 3) are formed in the thicker wall portions 31, 32, respectively. Upper ends of the axial passages 33, 34 are opened at the upper end surface 12a defining the thicker wall portions 31, 32, to thereby form ports 35, 36 to which the tube-connecting fittings 22 are connected. A plurality (seven in the illustrated example) of circumferential grooves 41 are formed in an inner peripheral surface of the body 12, which is held in slide contact with an outer peripheral surface of the spindle 13. Of the plurality of circumferential grooves 41, six circumferential grooves are communicated with the axial passages 33, 34 formed in the thicker wall portions 31, 32 in one-to-one relation through radial passages 43, 44. Also, a plurality (seven when the number of the circumferential grooves 41 is seven) of axial passages 45 are formed inside the spindle 13 to be communicated with the plurality of circumferential grooves 41 in one-to-one relation through radial passages (not shown). The plurality of axial passages 45 are communicated with a plurality of radial passages 46 in a lower end portion of the spindle, and the plurality of radial passages 46 are opened at ports 47 to which the tube-connecting fittings 24 are connected, respectively.

Further, though not shown in FIG. 3, corresponding to the tube-connecting fitting 22 on the side opposed to the stopper portion 16 shown in FIG. 2, an axial passage similar to the axial passages 33, 34 is formed inside the body 12 at a matched position as viewed in cross-section, and the remaining one of the plurality of circumferential grooves 41 is communicated with that the axial passage.

An upper end surface of the spindle 13 is located near the upper end surface 12a of the body 12 and is limited in its top position by a positioning ring 51. Also, the cover 28 is fixed to the central area of the upper end surface 12a of the body 12 by bolts so that the upper end surface of the spindle 13 is covered with the cover 28. A port 52 for connection with the tube-connecting fitting 22 is formed at the center of the cover 28, and an axial passage 53 communicating with the port 52 is formed inside the spindle 13 at the center in the radial direction. The axial passage 53 is opened at a lower end surface of the spindle 13, and the tube-connecting fitting 24 is also connected to that opening (port) in a similarly manner.

With the passage arrangement described above, even when the body 12 is rotated relative to the spindle 13, respective pairs of portholes on the body 12 side and portholes on the spindle 13 side are always maintained in a communicated state, thereby holding communication between the tubes 21 on the body 12 side and the tubes 23 on the spindle 13 side, which are connected to the corresponding portholes. In addition, the tubes 21 can be connected to the upper end surface 12a of the body 12 in concentrated layout with a slight modification of the known structure.

A dust seal 55 contacting the outer peripheral surface of the spindle 13 is fitted to an inner circumferential surface of the body 12 at a lower end thereof, to thereby prevent dust, including earth and sand, from entering sliding surfaces, i.e., the inner peripheral surface of the body 12 and the outer peripheral surface of the spindle 13, from the exterior. Further, an O-ring seal 56 is fitted to the inner circumferential surface of the body 12 above the dust seal 55, to thereby prevent oil from leaking from the sliding surfaces. With the arrangement described above, the dust seal 55 holds a sealed-off state against intrusion of dust from the exterior, and the O-ring seal 56 holds a sealed-off state against leakage of oil from the interior.

Figure 4:
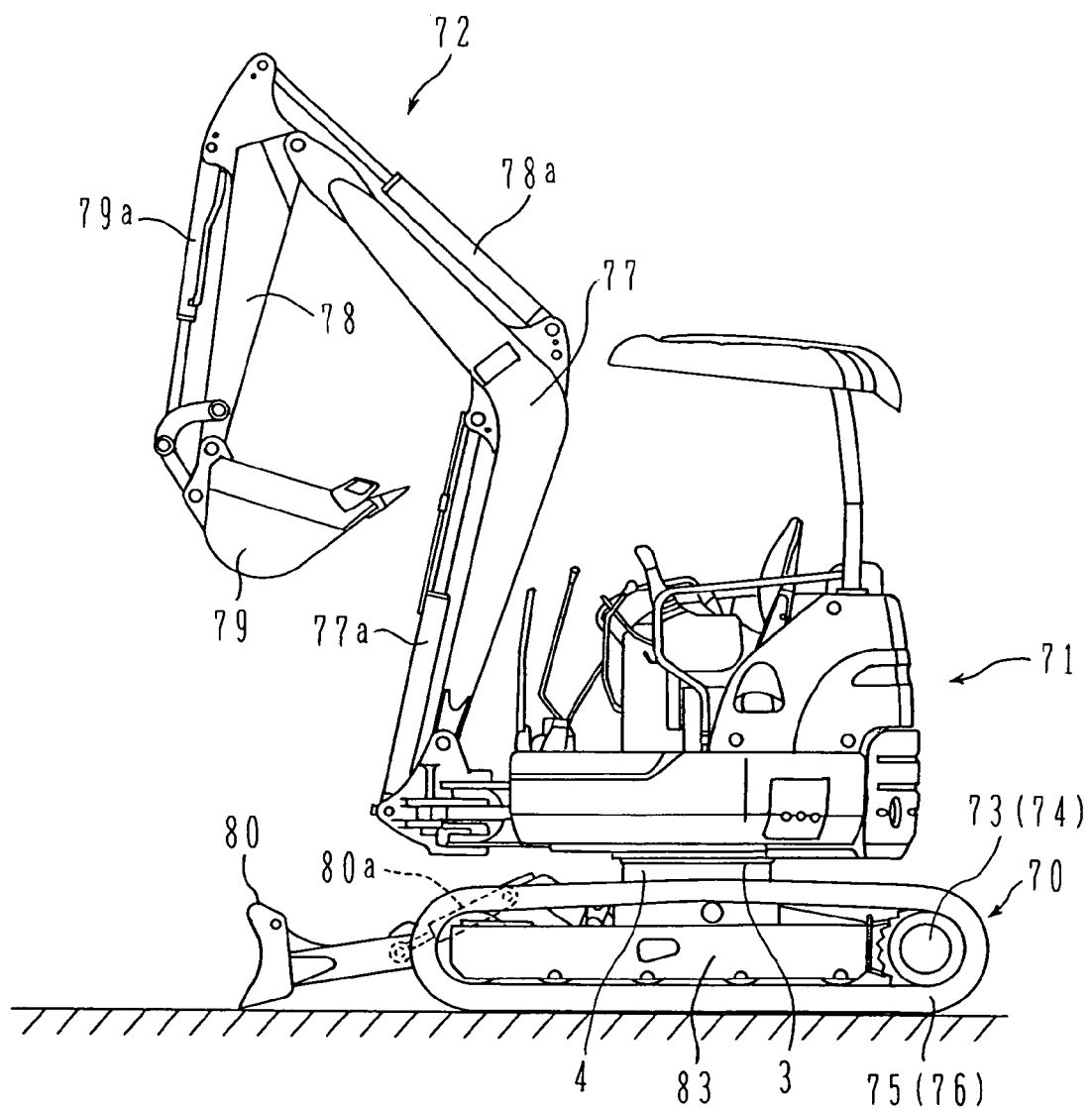
FIG. 4 shows an external appearance of a hydraulic excavator in which the swivel joint is mounted.

FIG. 4 shows an external appearance of a hydraulic excavator in which the swivel joint 11 is mounted. The hydraulic excavator comprises a lower travel structure 70, an upper swing structure 71, and a front operating mechanism 72. The lower travel structure 70 includes left and right travel motors 73, 74. The travel motors 73, 74 drive crawlers 75, 76 for rotation, respectively, so that the hydraulic excavator travels forward or backward. The swing motor 6 (see FIG. 1) is mounted on the upper swing structure 71, and the upper swing structure 71 is rotated by the swing motor 6 to swing rightward or leftward with respect to the lower travel structure 70. The front operating mechanism 72 comprises a boom 77, an arm 78, and a bucket 79. The boom 77 is vertically angularly moved by a boom cylinder 77a, and the arm 78 is operated by an arm cylinder 78a toward the dumping side (opening side) or the crowding side (scooping side). The bucket 79 is operated by a bucket cylinder 79a toward the dumping side (opening side) or the crowding side (scooping side). A blade 80 is mounted to a front portion of the lower travel structure 70 and is vertically angularly moved by a blade cylinder 80a.

Figure 5:
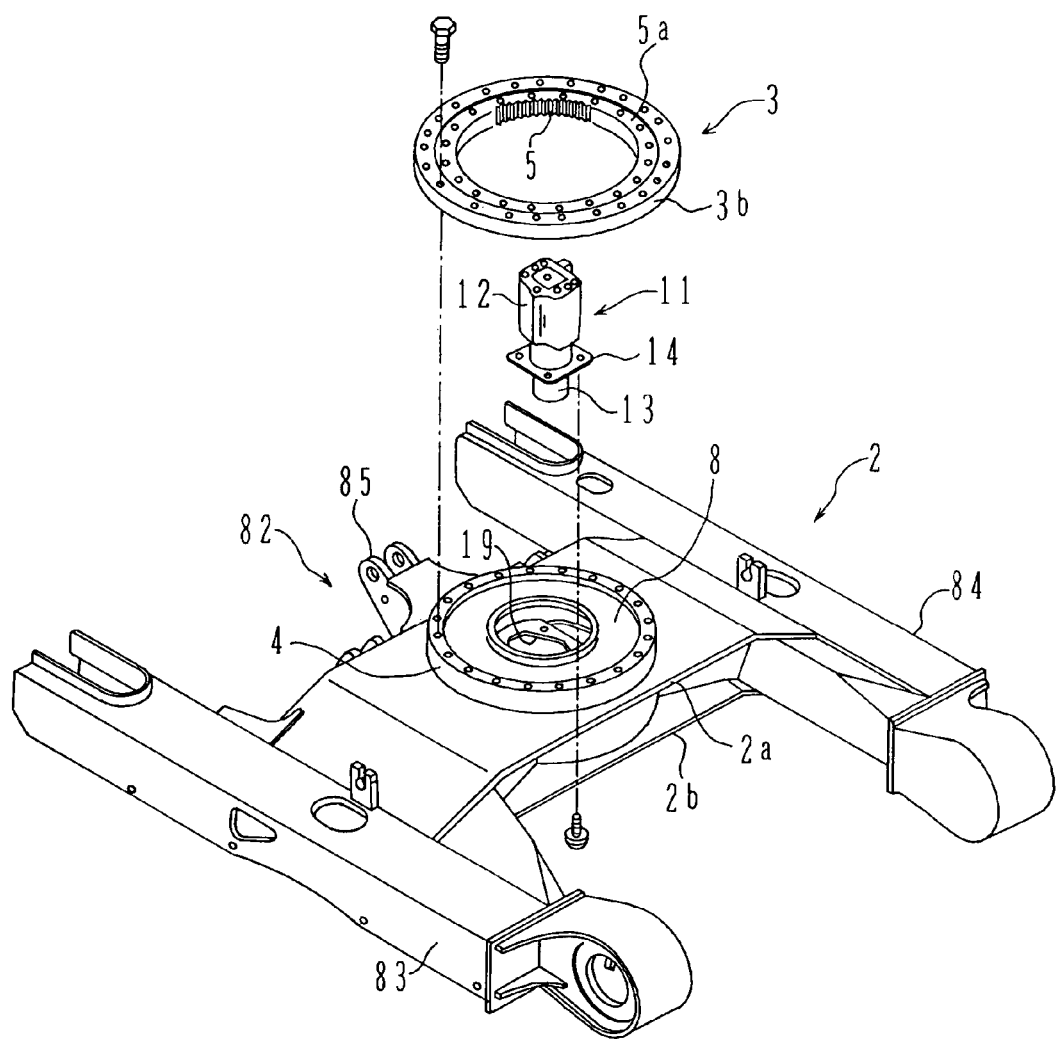
FIG. 5 shows a track frame section of a lower travel structure.

FIG. 5 shows a track frame section of the lower travel structure 70. The lower travel structure 70 has the above-mentioned track frame 2. The track frame 2 is made up of a center frame (main frame) 82 and left and right side frames 83, 84. The center frame 82 includes the upper track frame 2a and the lower track frame 2b both mentioned above. The travel motors 73, 74 and the crawlers 75, 76, shown in FIG. 4, are mounted on the side frames 83, 84, respectively. As described above, the swivel race support 4 is disposed on the upper track frame 2a, and the swivel race 3 is mounted to the swivel race support 4. The swivel joint 11 of the present invention is mounted to the lower track frame 2b. A support 85 to which the blade 80 is coupled in a vertically angularly movable manner is provided at front central portions of the upper and lower track frames 2a, 2b.

Advantages of this embodiment will be described below in comparison with the known structure.

Figure 6:
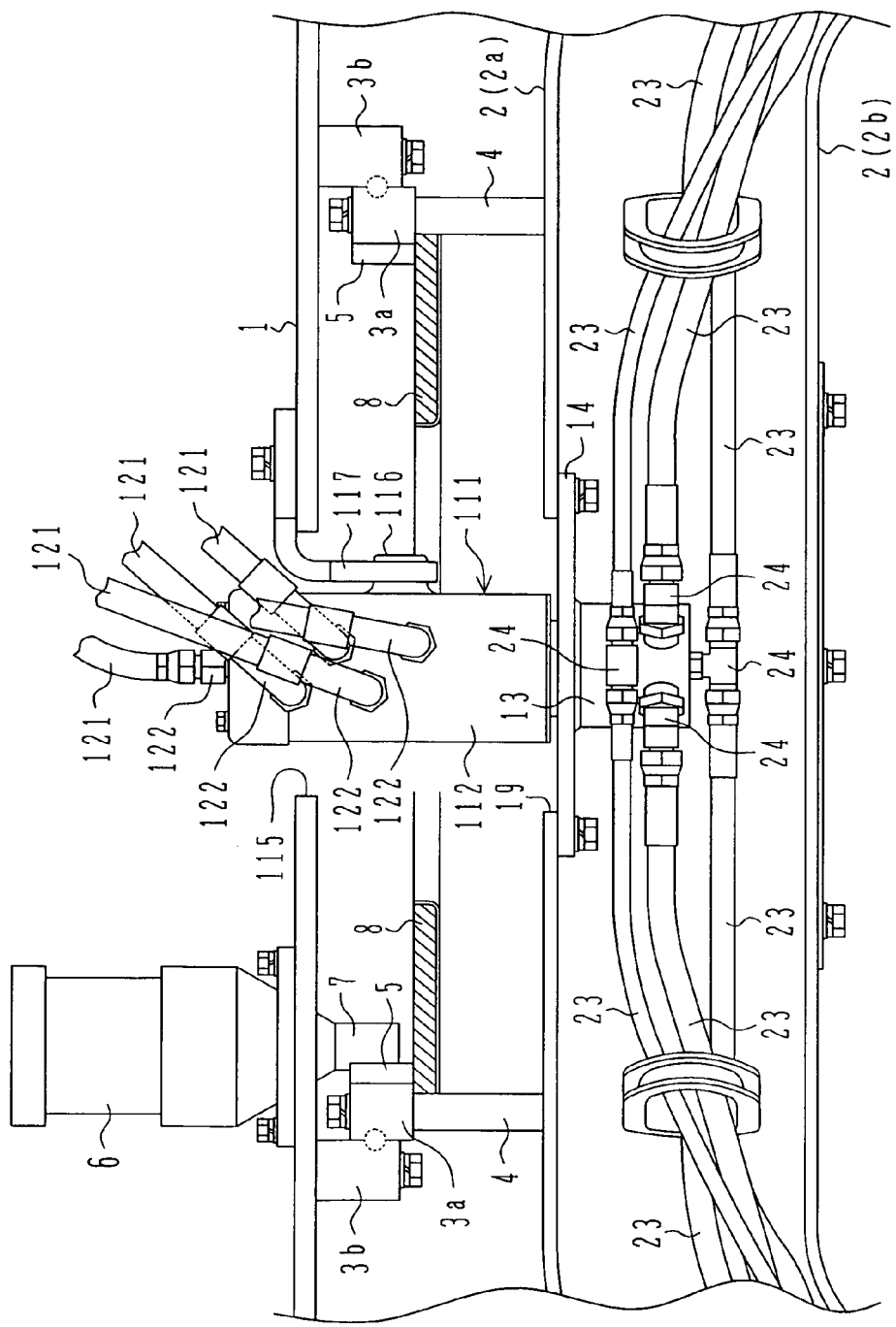
FIG. 6 is a sectional view showing a swivel joint in the related art in a mounted state.
Figure 7:
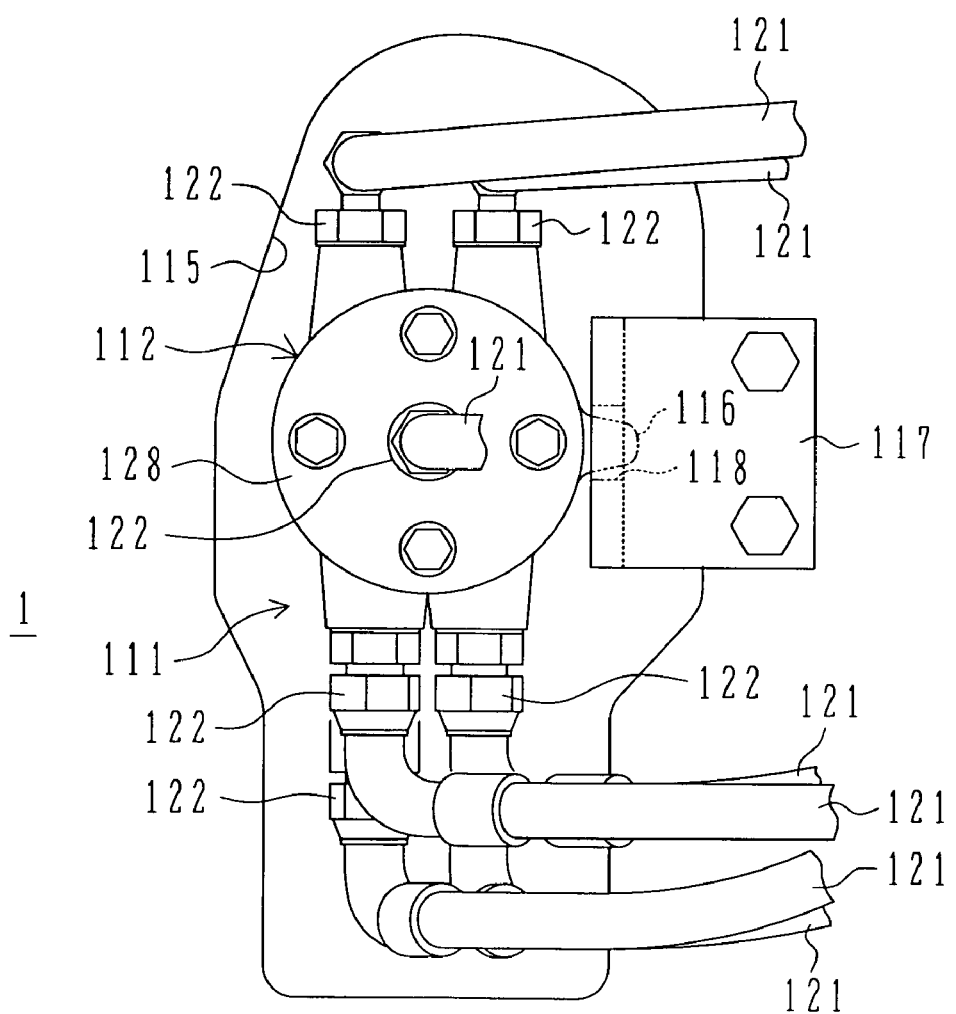
FIG. 7 shows the swivel joint and an opening of a swing structure main frame in the related art when looking from above.

FIGS. 6 and 7 show a known swivel joint in a mounted state. In FIGS. 6 and 7, identical members to those in FIG. 1 are denoted by the same symbols.

In FIG. 6, a swivel joint 111 comprises a body 112 and a spindle 13 rotatably inserted in the body 112. The spindle 13 is mounted to an upper track frame 2a by fixing a mount plate 14 to the edge of an opening 19 formed in the upper track frame 2a from below by bolts. The body 112 is positioned in an opening 115 formed in a swing structure main frame 1. A stopper projection 116 provided on the body 112 is engaged with a stopper plate 117 fixed to the main frame 1 by bolts, whereby the body 112 is rotatable together with the swing structure main frame 1.

To a lateral surface of the body 112, tubes 121 extending to hydraulic equipment disposed on a swing structure, such as valve apparatuses (directional control valves) for control of travel motors and a blade), are connected by fittings 122. Also, tubes 23 extending to hydraulic equipment disposed on a travel structure, such as the travel motors and a blade cylinder, are connected to a portion of the spindle 13 projecting below the mount plate 14 by fittings 24.

FIG. 7 shows the swivel joint 111 and the opening 115 of the swing structure main frame 1 when looking from above. An upper end surface of the body 112 of the swivel joint 111 has a substantially circular shape. The stopper projection 116 is projected from a lateral surface of the body 112 on the right side, as viewed in the drawing, so as to come into a groove 118 formed in the stopper plate 117. The fittings 122 for connecting the tubes are provided eight in total, i.e., four on the lower lateral surface, as viewed in the drawing, of the body 112, three (only two of which are shown in FIG. 7) on the upper lateral surface of the body 112, and one on a cover 128 disposed at a top of the body 112. Because the fittings 122 provided on the lateral surfaces of the body 112 are positioned below a bottom surface of the swing structure main frame 1 and are projected in certain lengths radially of the body 112, the opening 115 of the swing structure main frame 1 has an elongate shape in the up-and-down direction, as viewed in the drawing, corresponding to the amounts by which the fittings 122 are projected.

Inner passages formed in the swivel joint 111 are identical to those shown in FIG. 3 except for the following points. The body 112 does not have the thicker wall portions 31, 32 shown in FIG. 3, and passages corresponding to the radial passages 43, 44 in the body 12 shown in FIG. 3 are formed in the body 112. Further, the radial passages in the body 112 are directly opened at the lateral surfaces of the body 112 to form ports, and the tube-connecting fittings 22 disposed on the upper end surface 12a of the body 112 are connected to those ports. With that arrangement, even when the body 112 is rotated relative to the spindle 13, respective pairs of portholes on the body 112 side and portholes on the spindle 13 side are always maintained in a communicated state, thereby holding communication between the tubes 121 on the body 112 side and the tubes 123 on the spindle 13 side.

Additionally, as in the structure shown in FIG. 3, a dust seal and an O-ring each contacting an outer peripheral surface of the spindle 13 are fitted to an inner circumferential surface of the body 112 at a lower end thereof, to thereby prevent dust, including earth and sand, from entering the interior and prevent oil from leaking from the interior.

In the known structure shown in FIGS. 6 and 7, the tube-connecting fittings 122 are connected to the lateral surfaces of the body 112 at positions below the bottom surface of the swing structure main frame 1. This means the necessity of a space between the opening 115 of the main frame 1 and the body 112 for allowing passage of the tubes 121 and enabling work, such as connection and disconnection of the tubes 121, to be performed therein. In other words, a large gap (space) is required between the opening 115 of the main frame 1 and the body 112. As a result, earth and sand are dropped and accumulated on the mount plate 14 of the spindle 13, which serves as a mount member for the swivel joint 111, from above the swing structure main frame 1. Thus, the known structure easily allows dust, including earth/sand and water, to enter a lower-end sliding portion of the body 112 with respect to the spindle 13.

Although the dust seal is disposed in the lower-end sliding portion of the body 112 with respect to the spindle 13 to prevent intrusion of dust, including earth/sand and water, it is often hard in fact to completely prevent intrusion of the dust. The dust seal is intended to primarily prevent intrusion of small solid matters (dust) and has a difficulty in completely preventing intrusion of water. There is reported a trouble case where muddy water or the like intruded through the lower-end sliding portion of the body 112 with respect to the spindle 13 and caused galling of the swivel joint due to rusting.

Further, a grease bath 8 is formed around the swivel joint at a position between the swing structure main frame 1 and the upper track frame 2a to lubricate meshed portions between a gear 5 of an inner race 3a and a pinion 7 of a swing motor 6.

The grease bath 8 is preferably held as clean as possible from the viewpoint of maintaining a lubrication capability. With the known structure, however, because the large gap (space) is left between the opening 115 of the main frame 1 and the body 112 and earth/sand is apt to intrude through the gap and then into the lower side as described above, the intruded earth/sand is scattered over the grease bath 8. Accordingly, a difficulty arises in keeping the grease bath 8 clean for a long term, and the grease bath 8 has to be replaced in a relatively short term.

In contrast, according to this embodiment, as described above, the fittings 22 for connecting the tubes (hoses) 21 extending to the hydraulic equipment disposed on the swing structure, such as the valve apparatuses (directional control valves) for control of the travel motors and the blade, are disposed on the upper end surface 12a of the body 12 in concentrated layout, and the tubes 21 are also connected in concentrated layout. Hence, there is no longer required a space between the opening 15 of the swing structure main frame 1 and the body 12, which has been necessary for the purpose of allowing passage of the tubes 21 and enabling work, such as connection and disconnection of the tubes 21, to be performed therein. In other words, as shown in FIG. 2, the gap (space) between the opening 15 of the main frame 1 and the body 12 can be made much smaller than that in the known structure shown in FIG. 7. As a result, the amount of earth/sand dropping onto the mount plate 14 of the spindle 13, which serves as the mount member for the swivel joint 11, from above the swing structure main frame 1 is greatly reduced, and the amount of earth/sand accumulated there is also reduced correspondingly. It is therefore possible to greatly reduce intrusion of dust, including water and earth/sand, to the lower-end sliding portion of the body 12 with respect to the spindle 13. Thus, dust resistance of the swivel joint 11 can be drastically increased.

Also, since the amount of earth/sand scattered over the grease bath 8 is greatly reduced, the grease bath 8 can maintain a good lubrication capability, and the service life of the grease bath can be prolonged correspondingly.

Further, since the tube-connecting fittings 22 are disposed on the upper end surface 12a of the body 12 in concentrated layout and the tubes 21 are also connected in concentrated layout, an effective outer diameter of the body, including the amounts by which the fittings 22 are projected, is reduced in comparison with that in the known structure, and an overall size of the swivel joint structure including tube-connecting portions can be reduced. In addition, since the fittings 22 and the tubes 21 can be positioned within an area defined by the outer diameter of the body 12, compact layout of the tubes 21 is realized.

With the known structure shown in FIGS. 6 and 7, the body 112 and the tube-connecting fittings are positioned under the swing structure main frame 1. At the time of replacing the swivel joint 111, therefore, a worker has to disconnect and connect the tubes 121 on the body 112 side by inserting the hand through the gap between the opening of the swing structure main frame 1 and the body 112, thus resulting in poor efficiency of the replacement work.

In contrast, according to this embodiment, the tube-connecting fittings 22 are mounted to the upper end surface 12a of the body 12 at a position higher than not only the upper end surface 12a of the body 12, but also the bottom surface of the swing structure main frame 1. At the time of, for example, replacing the swivel joint 11, therefore, the tubes 21 on the body 12 side can be disconnected at the position higher than the bottom surface of the swing structure main frame 1, and the work of disconnecting the tubes 21 can be greatly facilitated. Then, the swivel joint 11 can be easily removed through the steps of removing the cover 27 attached to the lower track frame 1b, disconnecting tubes 23 on the spindle 13 side, unfastening the bolts fixing the mount plate 14, and withdrawing the swivel joint downward. When a new swivel joint is mounted, the mounting work can be performed in sequence reversal to that the removing work. It is hence possible to greatly facilitate the work of replacing the swivel joint.

The invention claimed is:

1. A swivel joint for a construction machine comprising a lower travel structure and an upper swing structure mounted on said lower travel structure, hydraulic equipment disposed on said lower travel structure and including travel motors and a blade cylinder and hydraulic equipment disposed on said upper swing structure and including valve apparatuses for control of said travel motors and said blade cylinder, said swivel joint comprising a body rotating together with said upper swing structure, and a spindle mounted to said lower travel structure and rotatably inserted in said body, said spindle being fixedly mounted to said lower travel structure when said body rotates together with said upper swing structure, a plurality of first tubes which extend to said hydraulic equipment disposed on said upper swing structure and including said valve apparatuses for control of said travel motors and said blade cylinder being connected to said body and a plurality of second tubes which extend to said hydraulic equipment disposed on said lower travel structure and including said travel motors and said blade cylinder being connected to said spindle, said plurality of first tubes and said plurality of second tubes being communicated with each other through a plurality of circumferential grooves formed in an inner peripheral surface of said body and an outer peripheral surface of said spindle and through a plurality of axial passages formed inside said spindle such that said plurality of first tubes and said plurality of second tubes are coupled to each other in a relatively rotatable manner, wherein said body has first opposed sidewall portions positioned in opposed relationship to each other and second sidewall portions positioned between said first opposed sidewall portions, said first opposed sidewall portions having wall portions respectively thicker than said second sidewall portions and formed to extend axially from an upper end surface of said body, and wherein said thicker wall portions are formed with a plurality of axial passages communicating with said plurality of circumferential grooves in a row respectively within said thicker wall portions, said plurality of axial passages being open at said upper end surface of said body to provide a plurality of ports and said plurality of first tubes being connected to said plurality of ports whereby said plurality of first tubes are connected to said upper end surface of said body in concentrated layout.

2. The swivel joint for the construction machine according to claim 1, wherein the upper end surface of said body is positioned above a main frame constituting a bottom portion of said swing structure, and said plurality of first tubes are connected to said plurality of ports at a position higher than a bottom surface of said main frame.

3. A construction machine comprising a lower travel structure, an upper swing structure, mounted on said lower travel structure, hydraulic equipment disposed on said lower travel structure and including travel motors and a blade cylinder and hydraulic equipment disposed on said upper swing structure and including valve apparatuses for control of said travel motors and said blade, and a swivel joint for coupling a plurality of first tubes extending to said hydraulic equipment disposed on said upper swing structure and including said valve apparatuses for control of said travel motors and said blade cylinder and a plurality of second tubes extending to said hydraulic equipment disposed on said lower travel structure and including said travel motors and said blade cylinder in a relatively rotatable manner, wherein said swivel joint comprises a body rotating together with said upper swing structure, and a spindle mounted to said lower travel structure and rotatably inserted in said body, said spindle being fixedly mounted to said lower travel structure when said body rotates together with said upper swing structure, said plurality of first tubes being connected to said body and said plurality of second tubes being connected to said spindle, said plurality of first tubes and said plurality of second tubes being communicated with each other through a plurality of circumferential grooves formed in an inner peripheral surface of said body and an outer peripheral surface of said spindle and through a plurality of axial passages formed inside said spindle, wherein said body has first opposed sidewall portions positioned in opposed relationship to each other and second sidewall portions positioned between said first opposed sidewall portions, said first opposed sidewall portions having wall portions respectively thicker than said second sidewall portions and formed to extend axially from an upper end surface of said body, and wherein said thicker wall portions are formed with a plurality of axial passages communicating with said plurality of circumferential grooves in a row respectively within said thicker wall portions, said plurality of axial passages being open at said upper end surface of said body to provide a plurality of ports, and said plurality of first tubes being connected to said plurality of ports whereby said plurality of first tubes are connected to said upper end surface of said body in concentrated layout.

4. The construction machine according to claim 3, wherein the upper end surface of said body is positioned above a main frame constituting a bottom portion of said swing structure, and said plurality of first tubes are connected to said plurality of ports at a position higher than a bottom surface of said main frame.

* * * * *